(No Model.)
J. P. CASSELMAN.
GARDEN HOSE REEL.
No. 588,897. Patented Aug. 24, 1897.
Fig. 1.
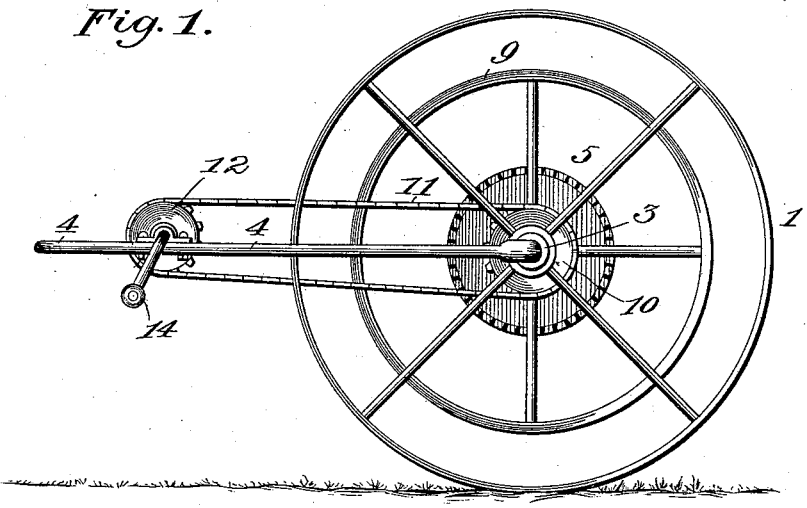
Fig. 2.   Fig. 3.
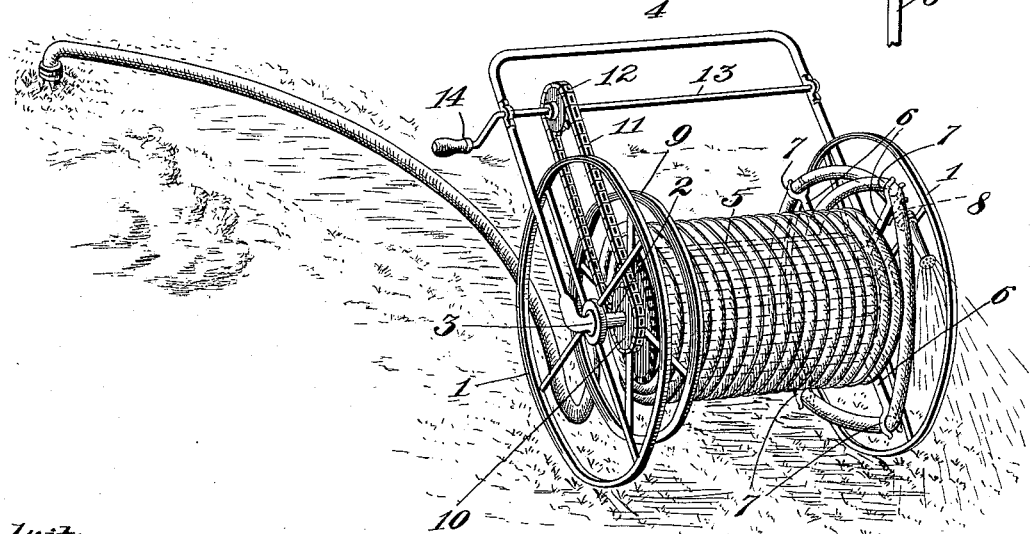
Witnesses:
John W. Gardner,
F. M. Heaton,
Inventor:
Judson P. Casselman.
By Edw. D. Duvall Jr.
his Attorney.

UNITED STATES PATENT OFFICE.

JUDSON P. CASSELMAN, OF NEBRASKA CITY, NEBRASKA.

GARDEN-HOSE REEL.

SPECIFICATION forming part of Letters Patent No. 588,897, dated August 24, 1897.

Application filed July 2, 1895. Serial No. 554,757. (No model.)

*To all whom it may concern:*

Be it known that I, JUDSON P. CASSELMAN, a citizen of the United States, residing at Nebraska City, in the county of Otoe and State of Nebraska, have invented a new and useful Lawn or Garden Hose Reel, of which the following is a specification.

My invention relates to improvements in hose-reels adapted for use in gardens or upon lawns; and the object of said invention is to provide a reel upon which the hose can be readily wound and which will permit of the use of the same without unwinding more of its length than is requisite to properly irrigate a given area.

With this and other objects and advantages in view my invention consists of certain new and novel features of construction hereinafter fully described and claimed and correctly illustrated in the accompanying drawings, in which—

Figure 1 is a side elevation of my improved reel; and Fig. 2 is a perspective view of the same, showing the hose properly wound thereon and ready for use. Fig. 3 is a detail view of one of the radial guard-arms.

Like numerals of reference designate like parts throughout the figures of the accompanying drawings.

1 1 represent the ground or traction wheels, mounted on the axle 2, whose terminals are properly journaled in the bearings 3, located at the ends of a U-shaped frame 4. This frame is designed for use also as the handle of the reel.

Revolubly mounted on the axle 2 is the hose-drum 5, provided at one end with the radiating guard-arms 6, each terminating in a pair of spring clamping-jaws 7. Upon one of the guard-arms 6, a short distance from the spring clamping-jaws thereof, is secured an auxiliary spring-clamp 8. This clamp is designed for the retention therein of the hose-nozzle, while the first winding of the hose is made within the spring clamping-jaws 7. The remainder of the hose is then wound evenly around the drum 5, throwing the union-coupling of the same upon the outside of the roll and free to be placed into engagement with a water-supply tap instead of inside the roll next the drum and necessitating the complete unwinding of the hose before the union-coupling can be made available.

The opposite end of the hose-drum is provided with a guard-wheel 9, designed, in conjunction with the aforesaid guard-arms 6, to confine the hose-windings within their limits.

Concentric with the axle 2 and secured to the hose-drum guard-wheel 9 is a sprocket 10, over which travels a sprocket-chain 11 and driven by a smaller sprocket 12, fixedly mounted upon a shaft 13, transversely journaled in the arms of the U-shaped frame 4, near the upper portion thereof. This shaft 13 is revolved by means of a crank-handle 14 within reach of the operator.

It will readily be seen from the foregoing description, in conjunction with the accompanying drawings, that I have provided a new and useful hose-reel adapted for convenient use in connection with garden or lawn purposes and one which obviates the necessity of entirely removing the hose from the reel when it is desirable to use it. In other words, my reel is intended as an assistance to the operator while irrigating and not merely for storage or drainage purposes.

I do not desire to limit myself to the precise details of construction herein shown and described, but reserve to myself the right and privilege to alter the same without departing from the spirit of the invention.

Having thus described my invention, what I claim as new, and desire to secure by Letters Patent, is—

In a hose-reel, the combination with a reel-frame, an axle secured in said frame against rotation, and ground-wheels revolubly mounted on said axle, of a drum revolubly mounted on said axle, and designed to have coiled thereon a length of hose, radial guard-arms at one end of said drum, spring-clips carried by said radial arms, and designed to receive and retain the first coil of the hose carrying the hose-nozzle, an auxiliary spring-clip on one of said arms, in which to secure the hose-nozzle, a sprocket-wheel mounted on a shaft, journaled in the frame near the handle-bar, the crank-handle secured to said shaft and the sprocket-wheel secured to the drum and connected with the first-named sprocket-wheel by a sprocket-chain, substantially as described.

JUDSON P. CASSELMAN.

Witnesses:
R. M. TAGGART,
S. P. VANATTA.